United States Patent [19]

Olavesen

[11] 4,421,634

[45] Dec. 20, 1983

[54] CATALYTIC DEWAXING WITH A HYDROGEN FORM ZEOLITE L CATALYST

[75] Inventor: Christopher Olavesen, Sarnia, Canada

[73] Assignee: Exxon Research and Engineering Co., Florham Park, N.J.

[21] Appl. No.: 469,932

[22] Filed: Feb. 25, 1983

Related U.S. Application Data

[63] Continuation of Ser. No. 381,225, May 24, 1982, abandoned, which is a continuation of Ser. No. 865,956, Dec. 30, 1977, abandoned, which is a continuation-in-part of Ser. No. 781,884, Mar. 28, 1977, abandoned.

[51] Int. Cl.³ .................. C10G 45/54; C10G 45/64
[52] U.S. Cl. .................. 208/111; 208/143; 585/266
[58] Field of Search .................. 208/28, 111, 143; 585/266

[56] References Cited

U.S. PATENT DOCUMENTS

| | | | |
|---|---|---|---|
| 3,575,845 | 4/1971 | Miale | 208/111 |
| 3,835,027 | 9/1974 | Ward | 208/111 |
| 3,861,005 | 1/1975 | Steinmetz et al. | 208/111 |
| 3,929,617 | 12/1975 | Henry et al. | 208/96 |
| 3,945,943 | 3/1976 | Ward | 252/455 Z |
| 4,028,224 | 6/1977 | MacDonald et al. | 208/92 |
| 4,040,944 | 8/1977 | Kelley et al. | 208/89 |

Primary Examiner—Delbert E. Gantz
Assistant Examiner—O. Chaudhuri
Attorney, Agent, or Firm—Edward M. Corcoran; Joseph J. Allocca

[57] ABSTRACT

Waxy, normal paraffin-type hydrocarbons present in petroleum oil feedstocks are selectively hydrocracked to hydrocarbons boiling below the boiling range of the feedstock by contacting the oil, in the presence of hydrogen, with a catalyst comprising a hydrogen form Zeolite L crystalline alumino-silicate containing at least one catalytic metal component selected from Group VIII and/or Group VI of the Periodic Table. This process is useful for dehazing oils such as white oils, for decreasing the pour point of jet fuels, for dewaxing lube oil feedstocks, including transformer oils and simultaneously reduces the aromatics content of the oil.

31 Claims, 1 Drawing Figure

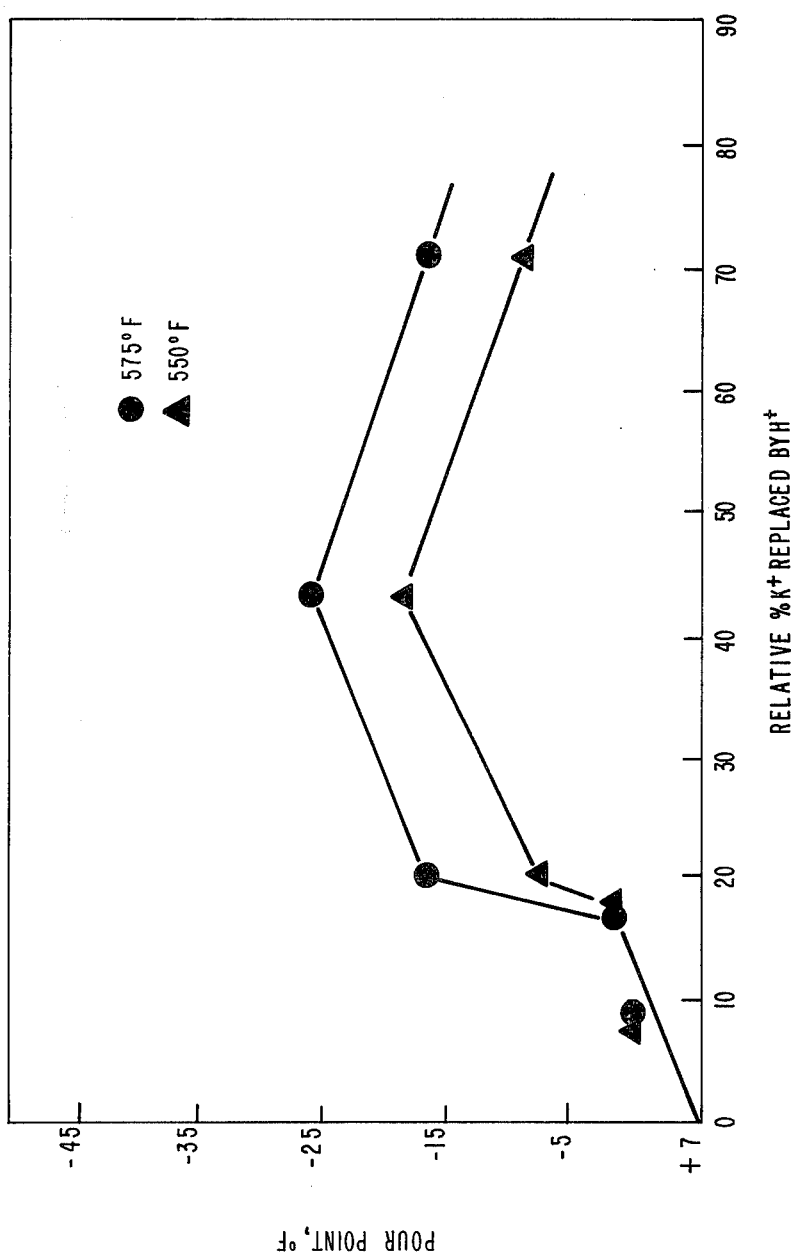

CATALYTIC DEWAXING WITH A HYDROGEN FORM ZEOLITE L CATALYST

CROSS REFERENCE TO RELATED APPLICATIONS

This is a continuation of application Ser. No. 381,225, filed May 24, 1982, now abandoned, which is a continuation of Ser. No. 865,956, filed Dec. 30, 1977 (abandoned) which is a continuation-in-part of Ser. No. 781,884 filed Mar. 28, 1977 (abandoned).

BACKGROUND OF THE INVENTION

1. Field of the Invention

This invention relates to the selective conversion of hydrocarbons. More particularly, this invention relates to the selective hydroconversion of waxy, normal paraffin type hydrocarbons present in hydrocarbon oil feedstocks to lower boiling hydrocarbons. Still more particularly, this invention relates to a process wherein waxy hydrocarbons present in petroleum feedstocks are selectively hydrocracked to hydrocarbons boiling below the boiling range of the feedstock and wherein the aromatics content of said feedstock is simultaneously reduced by contacting the feedstock and hydrogen with a catalyst comprising at least one catalytic metal component and a hydrogen from Zeolite L crystalline alumino-silicate and recovering a product having a reduced wax content.

2. Description of the Prior Art

It is well known in the art to dewax wax-containing mineral oils, particularly the lube oil fractions of petroleum oil, in order to remove at least a portion of the wax therefrom to obtain a dewaxed oil of reduced pour point. For many years this wax has been removed via various solvent dewaxing processes. In solvent dewaxing processes the temperature of the wax-containing oil is lowered sufficiently to precipitate the wax therefrom as solid crystals of wax. At the same time, solvents are added to the waxy oil in order to improve the fluidity and reduce the viscosity thereof so that various filtration or centrifugation processes can be used in order to separate the wax from the dewaxed oil. Wax anti-solvents such as ketones are often added to decrease wax solubility in the oil-solvent mixture. There is usually a pour-filter temperature spread in solvent dewaxing processes. That is, the wax filtration temperature must generally be around 10° to 20° F. lower than the pour point requirements of the dewaxed oil.

Concomitant with the world-wide decreasing supply of naphthenic crudes heretofore used to make very low pour point oils such as transformer oils, there has been an increase in the demand for these oils due to the continuously increasing demand for electrical power. Transformer oils used in colder climates generally have a pour point requirement of around −50° F. It is technologically unfeasible to obtain these low pour transformer oils via solvent dewaxing of paraffinic oils, because of the extremely severe refrigeration requirements. White oils are highly refined petroleum oils which must meet various requirements including haze-free water whiteness and are generally produced from naphthenic stocks which sometimes contain around 1 or 2% wax. This was can affect the pour point of the oil and results in a haze which is cosmetically objectionable. It is also technologically unsound to solvent dewax these white oils. Certain middle distillate fuels must also have low pour points so that the fuels do not congeal at low temperatures. This is especially true for jet fuels.

In recent years, various catalytic dewaxing processes have been proposed, although none of these processes has yet been commercially adopted by the petroleum industry. For example, U.S. Pat. No. 3,039,953 discloses a catalytic process for dewaxing wax-containing hydrocarbon oils wherein the normal paraffinic wax constituents contained therein are broken into lower molecular weight olefins and gases using crystalline alumino-silicate Zeolites such as chabazite, analcite and mordenite having a uniform pour opening of about 5 Å; U.S. Pat. No. 3,395,096 discloses a process for selectively hydrocracking straight chain hydrocarbons contained in hydrocarbon feedstocks, which is useful for dehazing white oils and dewaxing lube oils, using a rare earth promoted Zeolite A or erionite having uniform pour openings of less than about 6 Å; U.S. Pat. No. 3,625,880 claims selectively removing normal paraffins from hydrocarbon feeds using erionite that has been at least partially decationized. Molecular sieves such as erionite have been found to be useful for catalytically dewaxing and dehazing lighter fuel fractions ranging up to and through fractions such as jet fuel. However, when higher boiling fractions such as lube oil fractions are catalytically dewaxed using catalysts such as erionite, coke very quickly builds up on the catalysts thereby deactivating them.

More recently, it has been found that mordenite, particularly the hydrogen form of mordenite commonly referred to in the art as decationized or H-mordenite, and certain ZSM-type crystalline alumino-silicates are effective in catalytically dewaxing the heavier petroleum oil fractions such as lube oil fractions. U.S. Pat. No. 3,516,925 and U.S. Pat. No. 3,539,498 disclose catalytically dewaxing these heavier hydrocarbon oil fractions over a decationized or hydrogen form of mordenite. The mordenite preferably contains a hydrogenation component selected from one or more Group VI and VIII metals and oxides thereof. The wax-like hydrocarbons, particularly the normal paraffin types, are selectively hydrocracked into lower boiling hydrocarbons which are primarily gases at room temperature, thereby producing a dewaxed oil product having a substantially lower wax content and pour point, but whose boiling range is the same as the boiling range of the feed. U.S. Pat. No. 3,700,585 discloses the use of crystalline alumino-silicates of the ZSM-5 and ZSM-8 type for catalytically dewaxing both normal and slightly branched paraffins from hydrocarbon fractions such as jet fuel and lube oil fractions.

A number of improvements and additions to the use of decationized or hydrogen form of mordenite and/or ZSM-5 crystalline alumino-silicates have been made. U.S. Pat. No. 3,663,430 discloses that superior results are obtained if the mordenite catalyst contains a silica-to-alumina ratio of at least 20:1, while British Patent No. 1,134,014 discloses that the silica/alumina ratio of the mordenite should be at least 14:1. U.S. Pat. No. 3,438,887 discloses a three-step process for producing lube oils comprising solvent refining followed by catalytically dewaxing over hydrogen or decationized mordenite and then hydrorefining the solvent refined, dewaxed oil. U.S. Pat. No. 3,647,681 discloses an improvement to catalytic dewaxing processes employing decationized mordenite as a catalyst wherein the improvement comprises poisoning or blocking off the surface sites of the catalyst by laying carbon down thereon so that the catalyst contains at least ½ wt. % of carbon before it is used for catalytic dewaxing. Higher yields of dewaxed product are claimed by the use of this invention. U.S. Pat. No. 3,986,982 discloses an improved method for regenerating H-mordenite which has been deactivated during a catalytic dewaxing process and suggests that this regenerating method may also be applicable to other Zeolites such as Zeolite Y, T, L, erionite and offretite. Similarly, U.S. Pat. No. 3,894,938 and U.S. Pat. No. 3,956,102 disclose improvements in the use of ZSM-5 type zeolites in catalytic and hydroprocessing processes.

The prior art teaches that various other types of crystalline alumino-silicates are not suitable for use in catalytic dewaxing processes. U.S. Pat. No. 3,539,498 mentions that faujasite and types A, X, Y and L synthetic zeolites are capable of selectively adsorbing particular hydrocarbon types from each other, but does not suggest that any of these materials could be used in a catalytic dewaxing process. Further, U.S. Pat. No. 3,956,102 teaches that large pore size crystalline alumino-silicates or zeolitic molecular sieves represented by zeolites of type X, Y and L, admit all components normally found in petroleum distillate charges and are therefore unsuitable for use in catalytic dewaxing or hydrodewaxing processes and that only those which have a pore size of approximately 5 Å and the ZSM-5 type are suitable because they will admit only normal and/or slightly branched paraffins present in a hydrocarbon feed charge. This prior art contention is re-enforced in U.S. Pat. No. 3,968,024 directed towards an improved catalytic hydrodewaxing process employing ZSM-5 type zeolites, wherein the same crystalline alumino-silicates (X, Y and L) are mentioned for one purpose or another, but are not suggested as being useful for catalytic dewaxing processes. Similarly, U.S. Pat. No. 3,663,430 discloses that Zeolites A, X and Y were tried and found to be unsuitable. Therefore, in view of the teachings of the prior art, the instant invention was surprisingly unexpected.

SUMMARY OF THE INVENTION

A process for catalytically dewaxing waxy hydrocarbons from wax-containing hydrocarbon oil feedstocks has now been discovered, which comprises contacting said feedstock at elevated temperature and pressure and in the presence of hydrogen with a catalyst comprising a hydrogen form Zeolite L molecular sieve or crystalline alumino-silicate and recovering an oil product having a reduced wax content. In the process of this invention, waxy hydrocarbons present in the feedstocks are selectively hydrocracked to hydrocarbons boiling below the boiling range of the feedstock. If the Zeolite L is not at least partially decationized and converted to the hydrogen form it will not work effectively in the process of this invention. It is preferred, that the hydrogen form Zeolite L contain one or more catalytic metal components selected from the group consisting of Group VI and Group VIII metals of the Periodic Table, their oxides, sulfides and mixtures thereof. It has further been discovered that the selectivity of the decationized Zeolite L for hydrocracking wax is greatly improved if the external surface of the sieve is poisoned or made catalytically inactive. It has still further been discovered that the process of this invention simultaneously reduces the aromatics content of the feed.

As heretofore mentioned under the prior art, supra, crystalline alumino-silicates of the Zeolite L type are well known. These materials are characterized in that they have a one-dimensional channel system parallel to the C-axis with a calculated free aperture size of about 7.1 Å. U.S. Pat. No. 3,216,789, the disclosures of which are incorporated herein by reference, discloses the composition, characterization and preparation of Zeolite L types of crystalline alumino-silicates. Zeolite L has a general formula as follows:

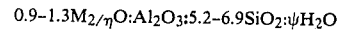

$$0.9\text{-}1.3M_{2/\eta}O:Al_2O_3:5.2\text{-}6.9SiO_2:\psi H_2O$$

Wherein "M" designates at least one exchangeable cation hereinbelow defined; "$\eta$" represents the valence of "M;" and "$\psi$" may be any value from about 0 to about 9. Further, the value of "$\psi$" depends upon the identity of the exchangeable cations and also upon the degree of dehydration of the zeolite.

The exchangeable cations that may be present in Zeolite L include mono-, di- and trivalent ions, particularly those of Groups I, II and III of the Periodic Table, such as potassium, sodium, barium, calcium, cerium, magnesium, lithium, strontium, zinc ions, etc., and the like, and other cations for which example hydrogen, ammonium and alkylammonium ions, which with Zeolite L behave like the metal ions mentioned above in that they may be replaced for other exchangeable cations without causing a substantial alteration of the basic crystal structure of the zeolite. However, although there are a number of cations that may be present in Zeolite L, in the commercially available form substantially all of the exchangeable cations are potassium ions.

Synthesis of the Zeolite L catalyst is well known in the art. For example, the zeolite may be crystallized from a suitable aqueous metal alumino-silicate mixture at temperatures ranging from 20° to 175° C. Typical methods of synthesis are shown, for example, in U.S. Pat. No. 3,216,789, the disclosures of which have been incorporated herein by reference.

Zeolite L will not selectively hydrocrack wax from petroleum oil stocks, such as white oil, jet fuel or lube oil stocks, unless it is decationized and converted to the hydrogen form. By decationization and conversion to the hydrogen form is meant that the exchangeable metal cation, such as potassium, is at least partially replaced with hydrogen. Preferably at least about 10%, more preferably from about 15 to 75% and still more preferably from about 40 to 60% of the exchangeable metal cations in the sieve have been exchanged with hydrogen ion to produce the hydrogen form Zeolite L useful in this invention. The attached FIGURE is a graph illustrating the hydrodewaxing activity of a Zeolite L catalyst as a function of the replacement of potassium with hydrogen in the sieve. It has been found that, in general, the activity or ability of the Zeolite L catalyst to dewax the oil increases with increasing replacement of potassium with hydrogen in the sieve, reaching a maximum between about 40 to 50%. Methods for replacing the metal cations with hydrogen are well known in the art. Various methods of decationizing Zeolite L and converting it to the hydrogen form are described in U.S. Pat. No. 3,130,006, the disclosures of which are incorporated herein by reference. The decationization treatment is preferably carried out by base exchanging a metal cation form of Zeolite L, such as the potassium form, with ammonium cations. The ammonium-ion exchanged molecular sieve is then heated to drive off ammonia, leaving behind the decationized or hydrogen form of Zeolite L.

As hereinbefore described, supra, it is preferred that the hydrogen form Zeolite L contain one or more metal hydrogenating components selected from the group consisting of Group VI and Group VIII metals, their oxides, sulfides and mixtures thereof. Preferably, the catalytic metal component of the catalyst is a platinum group metal, particularly platinum or palladium, and may be added by any of the well known methods such as ion-exchange or impregnation. The amount of platinum group metal added to the catalyst is preferably within the range of 0.05 to 10 wt. %, more preferably 0.1 to 5 wt. % and most preferably 0.2 to 2.0 wt. % calculated as metal and based on the total weight (dry basis) of the catalyst. Iron group metals such as nickel also give useful results and they may be used in greater amounts than the platinum group metals, preferably within the range of 0.1 to 50 and more preferably 1.0 to 20.0 wt. % calculated as metal and based on the total weight (dry basis) of the catalyst. Mixtures of certain Group VI and Group VIII metals and compounds may also be used, for example, such as cobalt and molybdenum. Further, it may be advantageous to incorporate into the catalyst multivalent metals of Groups II and III in addition to one or more metals of Group VI and/or Group VIII.

As hereinbefore mentioned, it has also been discovered that still further improvements in the catalytic dewaxing process of this invention may be realized if the external exposed surfaces of the catalyst are poisoned. Any well known methods may be employed such as coke deposition or treatment with heavy metal or basic compounds. However, a preferred method is by treatment with an organic phosphorous compound capable of inhibiting the catalytic activity thereof and of such molecular size and shape as to be excluded from entering the pores in the catalyst and making contact with the active catalytic sites in the pores. That is, greater selectivity in catalytic dewaxing resulting in higher yields of dewaxed oil will be realized if the outer surface of the catalyst is poisoned and not the surfaces inside the pores, so that only the wax-like normal paraffins and perhaps the slightly branched normal paraffin hydrocarbons which can enter the pores are hydrocracked therein. The other molecules and molecular species which are too large to enter the pores will not be cracked if the external surface of the catalyst is poisoned. Suitable organic phosphorous compounds useful as poisoning media for the external catalytic sites of the Zeolite L include organic and particularly cyclic phosphates, phosphites, phosphonates, phosphonites and phosphines. Typical of such compounds are the dibenzylphosphates, dibenzylphosphites, dibutylphenylphosphonites, diphenylmethylphosphates, diphenylphenylphosphonites, diphenylphosphites, dicresylphosphites, ethylene(bis)diphenylphosphines, ethylene(bis)diphenylphosphine oxides, naphthylphosphates, triphenylphosphines, triphenylphosphine oxides, triphenylphosphates, triphenylphosphites, tri(dimethylphenyl)phosphates, and tricresylphosphates, with tricresylphosphates being particularly preferred, as taught in U.S. Pat. No. 3,575,845, the disclosures of which are incorporated herein by reference.

Poisoning of the external surface of the catalyst may be accomplished by addition of the organic phosphorous-containing poison compound to the charge stream prior to contacting with the catalyst. Alternatively, it may be desirable to contact the catalyst with a suitable poisoning compound prior to bringing the same into contact with the charge stock. In some instances, it may be feasible to contact the catalyst simultaneously with the poisoning compound, and the charge stock. Pretreating the catalyst with the poisoning compound may be accomplished by contacting particles of the catalyst with the poisoning material or a suitable solution containing an amount of such material sufficient to poison the exterior catalytic sites of said catalyst. The particles are thereafter removed from contact with the poisoning material or solution thereof and dried.

Suitable catalytic dewaxing process conditions include temperatures within the broad range of 450° to 950° F., preferably 500° to 850° F. and still more preferably 500° to 750° F., hydrogen pressures within the range of 100 to 5000 psig, preferably in the range of 200 to 2500 psig and most preferably from 400 to 1500 psig, a space velocity between 0.1 to 20 liquid volumes per hour per volume of catalyst (v/h/v), preferably 0.25 to 5.0 v/h/v, and hydrogen feed rates in the range of 0 to 20,000 SCF/B, more preferably 500 to 10,000 SCF/B and most preferably 1000 to 8000 SCF/B.

Almost any wax containing synthetic or petroleum oil feedstock or distillate fraction thereof which has been deasphalted may be catalytically dewaxed employing the process of this invention. Illustrative, but nonlimiting examples of such feedstocks are the middle distillate fractions, such as jet fuel boiling within the broad range of 300° to 650° F., and lube oil stocks such as (A) distillate fractions that have a boiling range within the broad range of from about 500° to 1300° F., with preferred stocks including the lubricating oil and speciality oil fractions boiling within the range of between about 550° and 1200° F., and (b) bright stocks and deasphalted resids having an initial boiling point above about 800° F. Additionally, any of these feeds may be hydrocracked prior to the catalytic dewaxing process of this invention. These stocks may come from any source such as the paraffinic crudes obtained from Aramco, Kuwait, the Pan Handle, North Louisiana, etc., the naphthenic crudes obtained from Venezuela, the U.S. Gulf Coast, Cold Lake (Alberta), etc., as well as synthetic crudes derived from the Athabasca Tar Sands, etc.

BRIEF DESCRIPTION OF THE DRAWING

The attached drawing is a graph illustrating the catalytic dewaxing activity of a Zeolite L catalyst as a function of the amount of potassium ions in the sieve that have been replaced with hydrogen.

DESCRIPTION OF THE PREFERRED EMBODIMENTS

The following examples further illustrate the present invention.

EXAMPLE 1

Zeolite L in the potassium cation form was obtained from the Linde Division of the Union Carbide Corp. designated as K-L Linde (hereinafter referred to as Zeolite K-L) having the unit cell composition shown below.

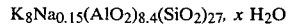

$K_8Na_{0.15}(AlO_2)_{8.4}(SiO_2)_{27} \cdot x\, H_2O$

The Zeolite K-L was supplied as a powder. In its anhydrous mode (i.e., dried at about 1000° F.) Zeolite K-L has a potassium content of 13 wt. %. However, if it is dried at about 250° F. it has a potassium content of 12 wt. % due to the presence of some water of hydration in the sieve. Sixty grams of the catalyst were treated with one liter of an aqueous 0.4 molar ammonium nitrate solution at reflux temperature for eight hours followed by calcination in air at 1000° F. for two hours to produce a partially decationized Zeolite K-L (hereinafter referred to as Zeolite HK-L) in which about 20% of the potassium ions initially present in the sieve were replaced with hydrogen ions. The powder was pressed into a cake, crushed and sieved into 7 to 14 mesh size particles which were used as catalysts in this experiment. Palladium was deposited on both the Zeolite HK-L and Zeolite K-L by soaking the catalyst particles in an aqueous, mildly acid palladium chloride solution containing sufficient palladium to produce a catalyst containing 0.25 wt. % palladium. The palladium containing catalysts were then calcined in air at 900° to 1000° F. for two hours and reduced in a stream of hydrogen at 650° F. for six hours. Wax-containing lube oil feedstock comprising solvent extracted paraffinic distillates having the properties shown in Table I were passed over the catalysts in the presence of hydrogen. The catalytically dewaxed product was then stripped to remove material boiling below 500° F. The results listed in Table I show that the Zeolite K-L which was not decationized or partially converted to the hydrogen form was ineffective in reducing the wax content as reflected in the pour point, whereas the decationized Zeolite HK-L removed a considerable amount of wax is reflected in the low pour points of −20° and −27° F.

EXAMPLE 2

In this example the effectiveness of the decationized or hydrogen form Zeolite HK-L from Example 1 was compared with decationized or H-mordenite known in the art as an effective catalyst for dewaxing lube oil fractions. Before the catalysts were used for catalytic dewaxing, the surface active sites were poisoned to see if there would be any improvement in catalyst selectivity. The catalysts were soaked in a 10 wt. % solution of tricresylphosphate (TCP) in n-heptane for a number of hours. The TCP treated catalysts were washed with heptane in order to remove any excess therefrom and then placed in reactors and heated in the presence of hydrogen to the reaction temperature at which point the liquid feed was cut in. The same type of lube oil feeds used in Example 1 was also used in this experiment.

The results are in Table II and show that, compared to the H-mordenite, not only did the Zeolite HK-L produce a much higher yield of dewaxed product at a comparable reduction in pour point, but it did so with no significant loss in VI, thereby illustrating that decationized Zeolite L can be used for catalytically dewaxing lube oil base stocks without the need for a prior or subsequent treatment to boost the VI which the art teaches is necessary when using H-mordenite.

The beneficial effect of the TCP treatment is reflected in the much superior selectivity of the treated catalyst. This is seen by comparing the data in Tables I and II at 576° F. for both the TCP treated and untreated Zeolite HK-L. Thus, the treated Zeolite HK-L produced a product yield of 89 wt. % of feed compared to 50.1 wt. % for the untreated Zeolite HK-L.

EXAMPLE 3

This example illustrates the effect of catalyst activity as a function of replacing potassium ions in the Zeolite K-L sieve with hydrogen ions. The waxy feed was similar to that used in Examples 1 and 2 and had a pour point of +7° F. The Linde Zeolite K-L was treated according to the following procedure.

(a) 60 g. of catalyst base were treated with one liter of NH$_4$Cl solution under reflux. Solution strength varied from 0.05N (normal) to 2N depending on the amount of potassium removed and replaced with hydrogen. For the case where 72% of the potassium ions were replaced with hydrogen ions, the catalyst base was given two treats with 2N NH$_4$Cl solution.

(b) The treated base was calcined in air at 1000° F. for two hours to convert the NH$_4$+ to H+ and the base was then pressed into pellets.

(c) The pellets were treated by soaking in a solution of PdCl$_2$ in a low concentration (i.e., <0.5N) HCl solution to impregnate the sieve with palladium so that the catalyst contained 0.25 wt. % Pd based on the total catalyst weight (dry basis).

(d) The Pd impregnated sieve was washed in water, dried at 248° F. and then calcined for one hour at 932° F.

(e) The calcined catalyst was then reduced in hydrogen at 752° F. to produce a finished catalyst. The waxy feed was passed over the catalyst at a liquid hourly space velocity of 1.0 V/h/V, at a hydrogen pressure of 600 psig and at temperatures of 550° and 575° F.

The results are plotted in the FIGURE which is a graph of catalyst activity as a function of potassium ion replacement with hydrogen ion. By activity is meant wax removal of dewaxed product (stripped to an initial boiling point of 500° F.) as reflected in pour point. It is apparent from the FIGURE that catalyst activity increases with increasing replacement of potassium ions with hydrogen ions, reaching a maximum between about 40 to 50% replacement. It is also obvious that for practical dewaxing activity at least about 10 to 15% of the potassium ions should be replaced with hydrogen ions.

TABLE I

| Catalyst Base | Zeolite K-L | | Zeolite HK-L | |
|---|---|---|---|---|
| Catalyst Metal | 0.25% Palladium | | 0.25% Palladium | |
| Reaction Conditions* | | | | |
| Temperature, °F. | 650 | | 550 | 576 |
| Inspections | Feed | Product** | Feed | Product** |
| Yield, wt. % | 100 | 90 | 100 | 73.5 | 50.1 |
| Pour, °F. | −5 | 1 | 3 | −20 | −27 |
| Viscosity, cSt @ 100° F. | 19.6 | 19.5 | 19.1 | 18.8 | 16.8 |
| Viscosity Index | 94 | — | 92 | 90 | — |

*Other conditions include H$_2$ pressure of 1350 psig, liquid hourly space velocity (LHSV) of 0.5 V/h/V (volumes of feed per hour per volume of catalyst) and a hydrogen gas rate of 2000 SCF/B (standard cubic feet per barrel of feed).
**Product stripped to 500° F.+.

TABLE II

| | TCP Treated Zeolite HK-L | TCP Treated H-Mordenite |
|---|---|---|
| Catalyst Metal | 0.25% Palladium | 0.5% Palladium |

TABLE II-continued

| Reactor Temperature, °F.* | | 576 | 601 | | 525 | 576 |
|---|---|---|---|---|---|---|
| Product Inspections | Feed | Product** | | Feed | Product** | |
| Yield, wt. % | 100 | 89 | 83 | 100 | 68 | 45 |
| Pour, °F. | 3 | −11 | −29 | 1 | −35 | −40 |
| Viscosity, cSt @ 100° F. | 19.1 | 16.7 | 17.9 | 19.3 | 29.6 | 42.7 |
| Viscosity Index | 92 | 90 | 89 | — | 73 | 45 |

*Other conditions are those in Table I.
**Products stripped to 500° F.+.

EXAMPLE 4

This example illustrates the ability of the hydrogen form Zeolite L dewaxing catalyst to simultaneously reduce both aromatics and wax content. About 20% of the potassium ions present in the Zeolite K-L sieve were replaced with hydrogen ions via treatment with 0.5N NH₄Cl for two hours on a steam bath. The treated sieve was washed free of excess salt and then calcined at 1004° F. for two hours to produce Zeolite HK-L. The Zeolite HK-L was then pressed into a cake, crushed and sieved. Palladium deposition, calcining and reduction of the catalyst were then carried out via the procedure used in Example 1. This experiment used the same type of feed as in Example 1.

The results are shown in Table III and are compared to results obtained from using H-mordenite. Thus, not only did the Zeolite HK-L catalyst reduce the wax content and pour point lower than that obtained with H-mordenite, it simultaneously produced a dewaxed product having an aromatics content substantially lower than that of the feed.

TABLE III
SIMULTANEOUS DEWAXING AND REDUCTION IN AROMATICS CONTENT

| Catalyst Base | H-Mordenite | | Zeolite HK-L | |
|---|---|---|---|---|
| Catalyst Metal | 0.5% Platinum | | 0.25% Palladium | |
| Reactor Conditions | | | | |
| Temperature, °F. | 500 | | 550 | |
| Pressure (psig H₂) | 1350 | | 1350 | |
| LHSV V/h/V | 1.0 | | 1.0 | |
| Gas Rate, SCF/B | 5000 | | 5000 | |
| Inspections | Feed | Product* | Feed | Product* |
| Pour, °F. | 1 | −15 | 7 | −22 |
| Yield, wt. % | 100 | 89 | 100 | 77 |
| Viscosity @ 100° F. (cSt) | 18.7 | 22.0 | 19.1 | 20.6 |
| Viscosity Index | 92 | 81 | 93 | 92 |
| Mass Spec Analysis (Total Oil) | | | | |
| Saturates, LV % | 87.0 | 86.1 | 87.6 | 91.8 |
| Aromatics, LV % | 13.0 | 13.9 | 12.4 | 8.2 |

*Products stripped to 500° F.+.

EXAMPLE 5

This example illustrates the fact that the process of this invention selectively hydrocracks waxy hydrocarbons to lower boiling hydrocarbons. In this experiment the feed was a wax boiling in the range of from 572° to 968° F. which was derived from a Western Canadian crude oil. The hydrogen form Zeolite L catalyst was prepared by boiling Linde Zeolite K-L in powder form for two hours in a 2 normal NH₄ Cl solution. The treated sieve or catalyst base was then washed with water after which 0.5 wt.% palladium was added by ion exchange with a Pd(NH₃)₄Cl₂ solution at a pH of 10. The ion-exchanged sieve was then washed with water and calcined in air for two hours at a temperature of 752° F. After calcining the catalyst was pelletized and treated with hydrogen for six hours at a temperature of about 572° F. to produce a finished catalyst. Analysis revealed that about 44% of the potassium ions remained in the sieve.

Two runs were made at a temperature of 550° F. and a pressure of 600 psig of hydrogen. The first run was made at a space velocity of 1.0 V/hr/V and the results are shown in Table IV. The second run was made under a more severe space velocity of 0.5 V/hr/V. In the second run all of the wax feed was converted to hydrocarbons boiling below the initial boiling point of the feed (572° F.) with a substantially greater amount of gaseous product formed than in the first run.

Turning to Table IV, the data show that under the less severe hydrocracking conditions over 50% of the wax was hydrocracked to lower boiling hydrocarbons boiling below the initial boiling point of the wax feed. Also, under the less severe hydrocracking conditions only 2.7 wt. % of the feed wax was converted to oil (per ASTM D721) boiling in the same range as the feed wax.

These data and the data from the other examples show that the reaction of the present invention is selective hydrocracking and that very little isomerization of the wax took place.

TABLE IV
ZEOLITE L SELECTIVITY FOR WAX CRACKING

| | Distribution by Carbon Number, Wt. % | |
|---|---|---|
| | Feed* | Product |
| $C_1$ | | 0 |
| $C_2$ | | 0 |
| $C_3$ | | 2.3 |
| $C_4$ | | 9.4 |
| $C_5$ | | 9.7 |
| $C_6 + C_7$ | | 14.0 |
| $C_8$ to $C_{12}$ | | 24.4 |
| $C_{12}$ to $C_{21}$ | 0.3 | 6.3 |
| $C_{22}$ | 0.8 | 0.2 |
| $C_{23}$ | 2.8 | 0.9 |
| $C_{24}$ | 6.5 | 2.2 |
| $C_{25}$ | 10.7 | 3.7 |
| $C_{26}$ | 13.8 | 4.8 |
| $C_{27}$ | 13.8 | 4.8 |
| $C_{28}$ | 12.8 | 4.5 |
| $C_{29}$ | 11.3 | 4.0 |
| $C_{30}$ | 8.7 | 3.0 |
| $C_{31}$ | 6.9 | 2.4 |
| $C_{32}$ | 4.7 | 1.6 |
| $C_{33}$ | 3.0 | 1.0 |
| $C_{34}$ | 1.9 | 0.6 |
| $C_{35}$ | 1.0 | 0.3 |
| $C_{36}$ | 0.5 | |
| $C_{37}$ | 0.3 | |
| $C_{38}$ | 0.2 | |

Note:
*Paraffin wax.

I claim:

1. A process for catalytically dewaxing an asphalt free, wax-containing hydrocarbon oil which comprises contacting said oil at elevated temperature and pressure and in the presence of hydrogen with a catalyst comprising a Zeolite L crystalline alumino-silicate that has been partially decationized to the hydrogen form and which contains at least one catalytic metal component selected from the group consisting of Group VI and Group VIII metals, their oxides, sulfides and mixtures thereof, to hydrocrack the wax components of said oil in preference over the oil components of said oil to hydrocarbons boiling below the initial boiling point of the oil and recovering an oil having a reduced wax content and reduced pour point.

2. The process of claim 1 wherein at least about 10% of the exchangeable cations in said Zeolite L have been replaced with hydrogen.

3. The process of claim 2 wherein said catalytic metal component is a platinum group metal and is present in said catalyst in an amount ranging from about 0.05 to 10 wt. % of said catalyst.

4. The process of claim 3 wherein said catalytic metal component is platinum or palladium.

5. The process of claim 4 wherein the external surface of said catalyst has been poisoned with an organic phosphorous compound.

6. The process of claim 4 wherein said oil contains aromatic components and wherein said process simultaneously reduces the aromatics content of said oil.

7. A process for catalytically dewaxing an asphalt free, wax-containing synthetic or petroleum oil fraction by hydrocracking the wax components of said oil in preference over the oil components of said oil to hydrocarbons boiling below the initial boiling point of said fraction which comprises contacting said fraction at elevated temperature and pressure and in the presence of hydrogen with a catalyst comprising a Zeolite L that has been partially decationized to the hydrogen form and which contains at least one catalytic metal component selected from the group consisting of Group VI and Group VIII metals, their oxides, sulfides and mixture thereof, and recovering an oil product having a reduced wax content and a reduced pour point.

8. The process of claim 7 wherein said catalytic metal is an iron group metal present in said catalyst in an amount ranging from about 0.1 to 50 wt. % of the catalyst or a platinum group metal present in an amount ranging from about 0.05 to 10 wt. % of the catalyst.

9. The process of claim 8 wherein at least about 10% of the exchangeable cations in said Zeolite L have been replaced with hydrogen.

10. The process of claim 9 wherein said elevated temperature and pressure range from about 450° to 950° F. and from about 100 to 5000 psig.

11. The process of claim 10 wherein said petroleum oil fraction is selected from the group consisting of (a) middle distillate fractions boiling within the range of 300° to 650° F. and (b) lubricating and specialty oil fractions having an initial boiling point above about 500° F.

12. The process of claim 11 wherein from about 15 to 75% of the exchangeable metal cations in the Zeolite L have been replaced with hydrogen.

13. The process of claim 12 wherein said oil contains aromatic components and wherein said process simultaneously reduces the aromatics content of said oil.

14. The process of claim 13 wherein said catalytic metal component comprises a platinum group metal and is present in an amount ranging from 0.05 to 10 wt. % of said catalyst.

15. The process of claim 14 wherein the external catalytic surface of said catalyst has been poisoned.

16. The process of claim 15 wherein said catalytic metal comprises platinum.

17. The process of claim 16 wherein said catalytic metal comprises palladium.

18. A process for simultaneously dewaxing and reducing the aromatics content of an asphalt free aromatics and wax-containing petroleum oil fraction selected from the group consisting of (a) middle distillate fractions boiling within the range of 300° to 650° F. and (b) lubricating and specialty oil fractions having an initial boiling point above about 500° F. which comprises contacting said fraction at a temperature ranging from about 450° to 950° F., in the presence of added hydrogen at a pressure of from about 100 to 5000 psig with a catalyst comprising a Zeolite L that has been partially decationized to the hydrogen form and which contains at least one catalytic metal component selected from the group consisting of Group VI and Group VIII metals, their oxides, sulfides and mixtures thereof to hydrogenate the aromatics and to hydrocrack the wax component of said oil in preference over the oil components of said oil to hydrocarbons boiling below the initial boiling point of said fraction and recovering a product having a reduced wax and aromatics content and a reduced pour point.

19. The process of claim 18 wherein at least about 10% of the exchangeable cations in said Zeolite L have been replaced with hydrogen ion.

20. The process of claim 19 wherein said catalytic metal component comprises a platinum group metal present in an amount ranging from 0.05 to 10 wt. % of the catalyst.

21. The process of claim 20 wherein said petroleum oil fraction comprises a lube oil raffinate.

22. The process of claim 21 wherein the external surface of said catalyst has been poisoned with a compound selected from the group consisting of (a) coke and (b) an organic phosphorous compound.

23. The process of claim 22 wherein from about 15 to 75% of the exchangeable metal cations in the Zeolite L have been replaced with hydrogen.

24. A process for hydrocracking the wax present in an asphalt free synthetic or petroleum oil feedstock in preference over the oil components of said oil feedstock to hydrocarbons boiling below the boiling range of said feedstock which comprises contacting said feedstock at elevated temperature and pressure and in the presence of hydrogen with a catalyst comprising a Zeolite L that has been partially decationized to the hydrogen form and which contains at least one metal catalytic component selected from the group consisting of Group VI and Group VIII metals, their oxides, sulfides and mixtures thereof, and in which at least about 10% of the exchangeable metal cations in said Zeolite L have been replaced with hydrogen ion and recovering a product having a reduced wax content and a reduced pour point.

25. The process of claim 24 wherein said elevated temperature and pressure range from about 450° to 950° F. and from about 100 to 5,000 psig.

26. The process of claim 25 wherein said catalytic metal component comprises a platinum group metal present in an amount ranging from 0.05 to 10 wt. % of the catalyst.

27. The process of claim 26 wherein from about 15 to 75% of the exchangeable metal cations in the Zeolite L have been replaced with hydrogen.

28. The process of claim 27 wherein the external surface of said catalyst has been poisoned.

29. The process of claim 28 wherein said external surface of said catalyst has been poisoned with a compound selected from the group consisting of (a) coke and (b) an organic phosphorous compound.

30. The process of claim 29 wherein said feedstock contains aromatic compounds and wherein said process simultaneously reduces the aromatic content of said feedstock.

31. The process of claim 30 wherein said feedstock is a petroleum oil feedstock and is selected from the group consisting of (a) middle distillate fractions boiling within the range of 300° to 600° F. and (b) lubricating and specialty oil fractions having an initial boiling point above about 500° F.

* * * * *